(12) United States Patent
Valmeti

(10) Patent No.: US 11,175,810 B2
(45) Date of Patent: *Nov. 16, 2021

(54) LOGICAL ZOOMING OF A DIRECTED GRAPH

(71) Applicant: International Business Machines Corporation, Armonk, NY (US)

(72) Inventor: Sreenivasulu Valmeti, Nellore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,101

(22) Filed: Aug. 31, 2019

(65) Prior Publication Data

US 2019/0384486 A1 Dec. 19, 2019

Related U.S. Application Data

(63) Continuation of application No. 15/286,866, filed on Oct. 6, 2016, now Pat. No. 10,402,069, which is a continuation of application No. 14/949,866, filed on Nov. 23, 2015, now Pat. No. 10,061,495, which is a continuation of application No. 11/958,726, filed on Dec. 18, 2007, now Pat. No. 9,471,193.

(51) Int. Cl.
| | | |
|---|---|---|
| G06F 3/048 | (2013.01) | |
| G06F 3/0484 | (2013.01) | |
| G06F 3/0481 | (2013.01) | |
| G06T 11/20 | (2006.01) | |
| G06F 3/0485 | (2013.01) | |

(52) U.S. Cl.
CPC ........ *G06F 3/04845* (2013.01); *G06F 3/0481* (2013.01); *G06F 3/04855* (2013.01); *G06T 11/206* (2013.01); *G06F 2203/04806* (2013.01)

(58) Field of Classification Search
CPC ....... G06F 2203/04806; G06F 3/04845; G06F 3/04855; G06F 3/0481; G06T 11/206
See application file for complete search history.

(56) References Cited

U.S. PATENT DOCUMENTS

| | | |
|---|---|---|
| 6,347,799 B1 | 2/2002 | Williams et al. |
| 6,462,762 B1 | 10/2002 | Ku et al. |
| 7,106,218 B2 | 9/2006 | Kimura |
| 9,471,193 B2 | 10/2016 | Sreenivasulu |
| 10,061,495 B2 | 8/2018 | Sreenivasulu |
| 10,402,069 B2 | 9/2019 | Sreenivasulu |
| 2004/0085347 A1 | 5/2004 | Hagarty et al. |
| 2004/0261029 A1 | 12/2004 | Skjaervik |
| 2005/0007383 A1 | 1/2005 | Potter et al. |

(Continued)

FOREIGN PATENT DOCUMENTS

EP 1510937 A1 * 3/2005 ......... G06F 16/9038

*Primary Examiner* — Pei Yong Weng
(74) *Attorney, Agent, or Firm* — Aaron N. Pontikos

(57) ABSTRACT

A method for displaying a relational diagram on a screen where at least one view of the relational diagram is larger than an available viewing area provided by the screen. The method comprises steps of detecting a predetermined action performed on a first element of the relational diagram, determining one or more relevant elements associated with the first element, and modifying a view of the relational diagram to display the first element and the one or more relevant elements on the screen.

9 Claims, 6 Drawing Sheets

(56) References Cited

U.S. PATENT DOCUMENTS

| | | |
|---|---|---|
| 2005/0038533 A1 | 2/2005 | Farrell et al. |
| 2005/0114786 A1 | 5/2005 | Decombe |
| 2005/0182773 A1 | 8/2005 | Feinsmith |
| 2005/0184989 A1 | 8/2005 | Areas |
| 2006/0048075 A1 | 3/2006 | Kim |
| 2006/0161855 A1* | 7/2006 | Robertson ............ G06F 16/904 715/765 |
| 2007/0153708 A1* | 7/2007 | Dominick ............... H04L 41/12 370/254 |
| 2009/0063557 A1 | 3/2009 | MacPherson |

* cited by examiner

LOGICAL ZOOMING OF A DIRECTED GRAPH

CROSS-REFERENCE TO RELATED APPLICATIONS

This application is a Continuation of U.S. patent application Ser. No. 15/286,866, filed on Oct. 6, 2016, which is a Continuation of U.S. patent application Ser. No. 11/958,726, filed on Dec. 18, 2007, the entirety of each which is incorporated herein by reference.

TECHNICAL FIELD

The present invention relates generally to the display of information, and in particular to the display of relationships between entities in large relational diagrams.

BACKGROUND

Conventional methods and apparatuses for displaying large diagrams are known. U.S. Pat. No. 6,437,799, describes a directed graph that is logically zoomed, whereby the appearance of a node directly related to a target node can be exaggerated and the structure of an entire graph can be readily understood. The directed graph is used in which hierarchical nodes are connected by arcs. In the directed graph, a node that has a predetermined logical relationship with a selected node is displayed differently than are the other nodes. For example, a displayed node logically near the selected node is large, while a displayed node logically distant is small, or the node logically near the selected node is moved closer to the selected node.

U.S. Pat. No. 7,106,218 describes a method and apparatus in which in a separate-window-display map search-and-display unit, where a current position or a cursor position arrives at a predetermined area near the outer circumference of a screen image during cursor-moving map scroll display is performed, a map-display-scale calculation unit calculates a wide-area map on a predetermined scale for displaying the current position and the cursor position on the same screen and a two-point-display map-search display searches for and displays a predetermined map. A separate-frame-window-display detailed-map search-and-display unit displays a current-position-centered detailed map and a cursor-position-centered detailed map in separate-frame windows.

United States Patent Application No. 20040261029 describes a method for flexible generation and presentation of diagrams on a computer display consisting of elements and connections between these elements displaying a diagram either partially or in full, allowing multiple occurrences of the same element, allowing redundancy of the same element, using diagram elements with different shapes and functions, displaying an element with all elements it has connections to next to it in a diagram called a Normal Diagram, displaying an element with all elements it has connections from next to it in a diagram called an Inverse Diagram, generating and/or displaying any partial diagram with any element in the diagram as a starting point, displaying arbitrarily complex diagrams in a simplified/collapsed manner, displaying traversing and editing large and complex diagrams easily in a limited amount of space by collapsing and expanding elements, in a Normal Diagram only allowing the Entrance Port(s) of any Shadow A to receive Connection(s) from the Exit Port(s) of one Shadow B at any time while the Exit Port(s) may each connect to the Entrance Pont(s) of zero or many other Shadows, in an Inverse Diagram only allowing the Exit Port(s) of any Shadow A to connect to the Entrance Port(s) of one Shadow B at any time while the Entrance Port(s) may each receive connections from the Exit Port(s) of zero or many other Shadows and displaying Normal- and Inverse diagram at the same time in a 3D diagram.

Therefore, in displaying and viewing large relational diagrams, if connected objects are not within the visible viewing area of a display window, it becomes difficult to identify items or objects that are connected by a connector or a link (relationship) in the relational diagram. If a user desires to view objects that are connected by a connector (link), the user is required to move the scroll bar such that the desired object is shown in the view area. A distinct disadvantage is in the case of relatively large diagrams, where it can be difficult to identify the right connector to navigate/follow in the diagram, etc. This is especially the case when no names or labels are associated with the connector. Therefore a need exists to ameliorate one of more of the above mentioned disadvantages.

SUMMARY

According to an aspect of the invention, there is provided a method for displaying a relational diagram on a display, wherein at least one view of the relational diagram is larger than an available viewing area provided by the display. The method comprises detecting a predetermined action performed on a first element of the relational diagram; determining one or more relevant elements associated with the first element; and modifying a view of the relational diagram to display the first element and the one or more relevant elements on the display.

According to another aspect of the invention, there is provided a data carrier signal operable to instruct a computer displaying a relational diagram on a display, whereon at least one view of the relational diagram is larger than an available viewing area provided by the display, to perform a process comprising detecting a predetermined action performed on a first element of the relational diagram; determining one or more relevant elements associated with the first element; and modifying a view of the relational diagram to display the first element and the one or more relevant elements on the screen.

According to another aspect of the invention, there is provided a computer system operable to display a relational diagram on a display, wherein at least one view of the relational diagram is larger than an available viewing area provided by the display. The computer system comprises detection means operable to detect a predetermined action performed on a first element of the relational diagram; determination mean operable to determine one or more relevant elements associated with the first element; and view modification means operable to modify a view of the relational diagram to display the first element and the one or more relevant elements on the screen.

BRIEF DESCRIPTION OF THE DRAWINGS

Some aspects of the prior art and one or more embodiments of the present invention will now be described with reference to the drawings, in which.

DETAILED DESCRIPTION

Method, system and computer program products for modifying a display of large relational diagrams are described. In the following detailed description of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
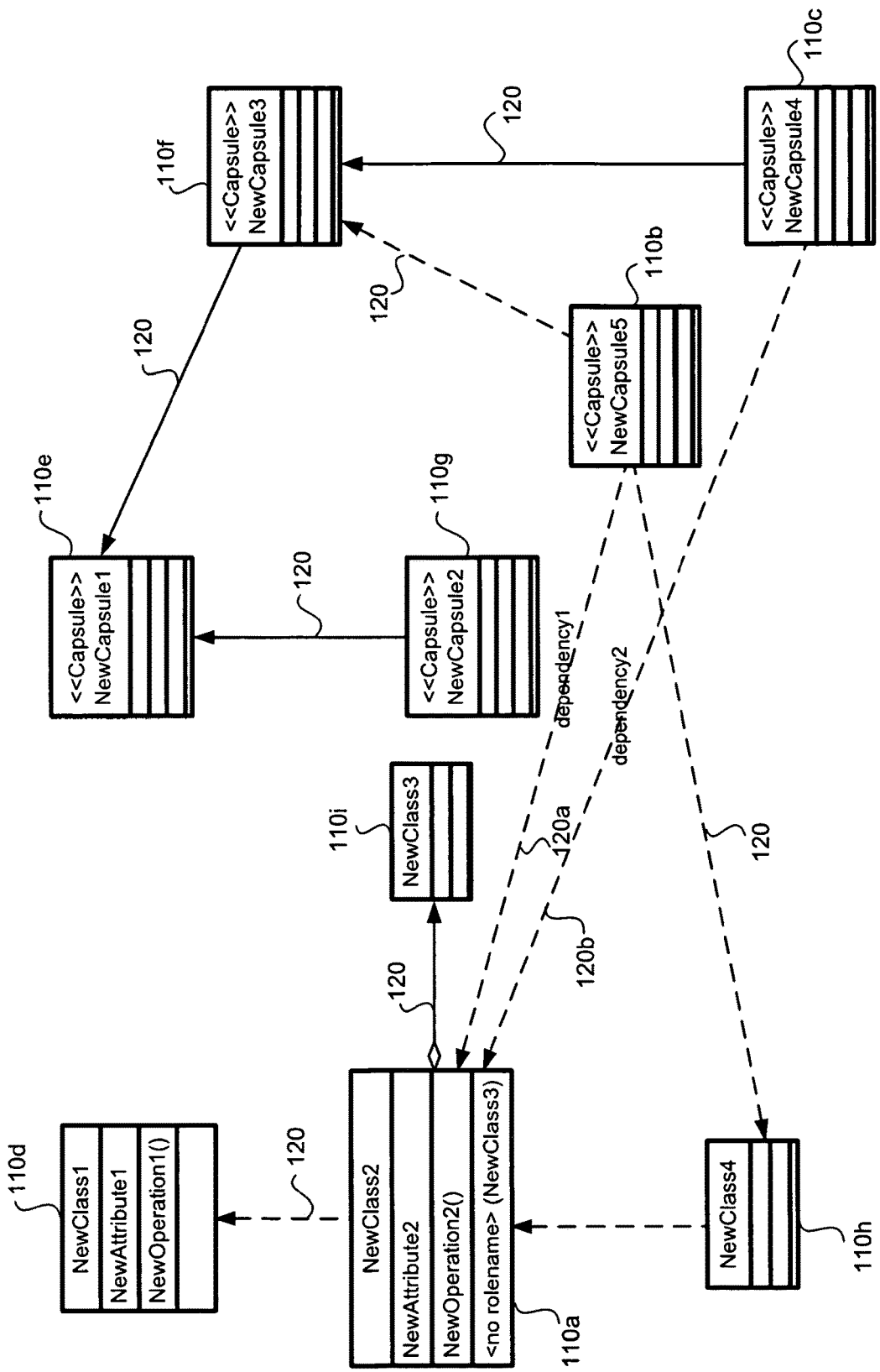
FIG. 1 is a large relational diagram.
Figure 2:
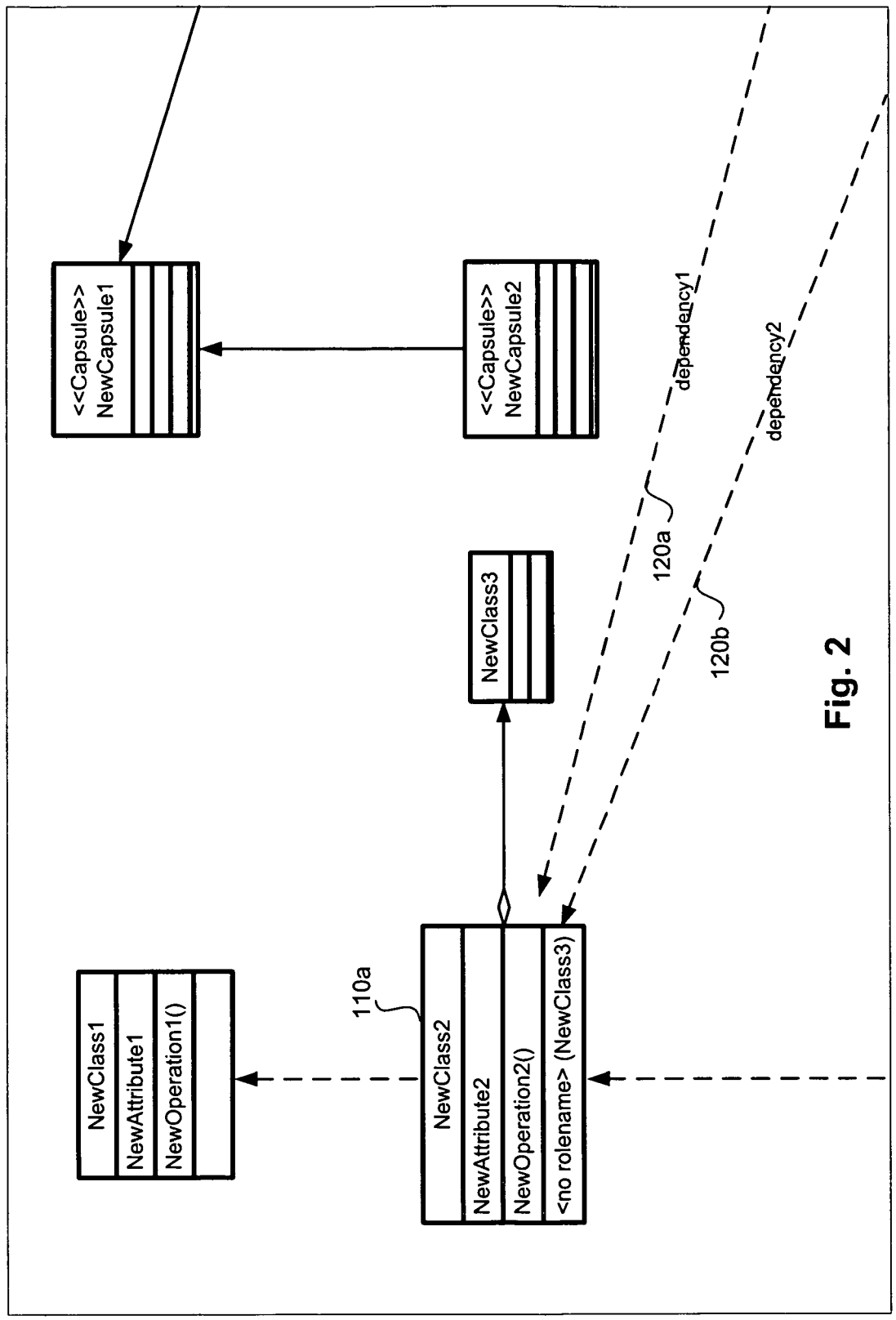
FIG. 2 illustrates the portion of a large relational diagram which is viewable on a screen.

FIG. 1 shows a large relational diagram 100. The diagram 100 of FIG. 1 is relatively large and hence cannot be displayed on a screen in its entirety. The diagram 100 includes objects 110a to 110i coupled via connectors 120. The connectors 120 may represent, for example, Unified Modelling Language (UML) relationships such as dependency, generalization or realization, etc., or any other type of relationship between the objects 110a to 110i FIG. 2 shows the upper left portion of the diagram 100. FIG. 2 is characteristic of the area of the diagram 100 that can fit on a display screen displaying the diagram 100. As shown in FIG. 1, connectors 120a and 120b couple object 110a to objects 110b and 110c. The objects 110b and 110c, however, cannot normally be viewed on the same screen (FIG. 2) as object 110a due to the diagram 100 being relatively large and hence not accommodated within the available display area. The objects 110b and 110c would hence lie outside the visible view area shown in FIG. 2.

Figure 3:
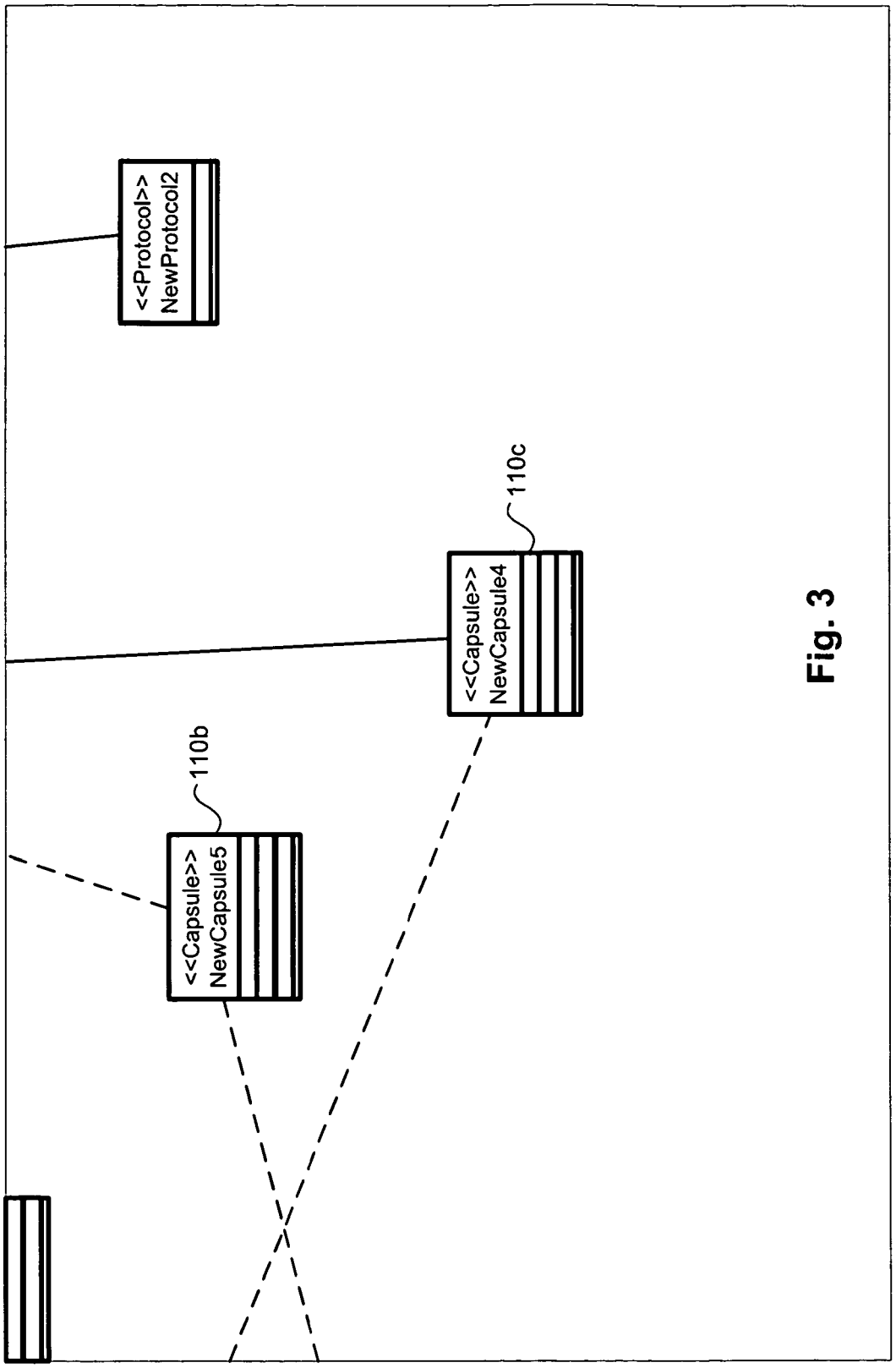
FIG. 3 illustrates another portion of a large relational diagram which is viewable on a screen.

FIG. 3 shows the bottom right portion of the diagram 100. As with FIG. 2, FIG. 3 is characteristic of the area of the diagram 100 that can fit on the display area displaying the diagram 100. FIG. 3 shows objects 110b and 110c, and connectors 120a and 120b, but is unable to show object 110a to which the objects 110b and 110c are coupled. Neither the viewing area shown by FIG. 2 nor the viewing area shown by FIG. 3 shows both the origin and termination of connectors 120a and 120b.

Figure 4:
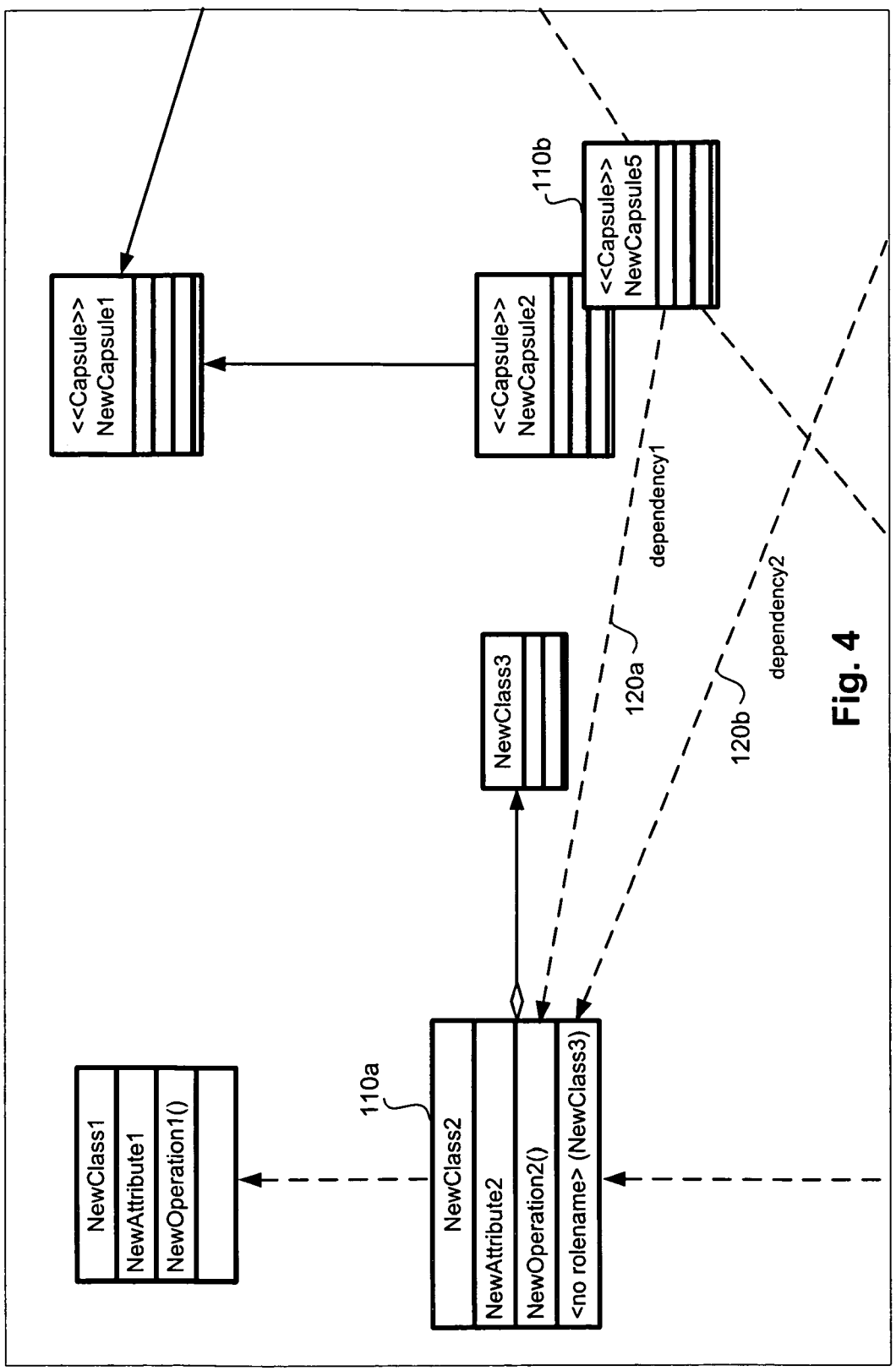
FIG. 4 illustrates a modified view of a large relational diagram.

FIG. 4 is a modified display of diagram 100 according to the present invention. In FIG. 4, when it is detected that a user has performed a cursor action on a connector whose origin and/or termination is not shown on the current screen, the originating and/or termination object of the connector is shown within the current visible view area, and the connector highlighted. For example, if a cursor action is performed on connector 120a when the area of diagram 100 being displayed is as shown by FIG. 2, the view shown in FIG. 2 is modified to that shown in FIG. 4 such that object 110b is brought into the viewing area, and connector 120a highlighted.

The current view may be modified in a number of ways, which may be pre-set by the user as user preferences. For example, the location of the present view in the diagram may be left unchanged, and all relevant elements pulled from outside of the current view into the current view. In a further embodiment, the location of the current view may be moved to a location in which as many relevant elements as possible can be displayed, and any remaining relevant elements still outside of the current view pulled into this view. In yet a further embodiment, the location of the current view may default to centering on an originating object or to a terminating object or to any other predetermined relevant element, with all other relevant elements still outside of this view pulled into this view. In yet a further embodiment, the location of the present view may be moved to a location determined in accordance with a predetermined function, such as a function for determining the relative importance of relevant elements, priority, optimality, and the like, and all remaining relevant elements still outside of this view pulled into this view.

The objects of the diagram are not limited, and may, for example, represent a number of related images related to a computer tomography scan, wherein a number of slices of a region of interest are studied and the connectors may show a dependency between the various images. It should be apparent to a person skilled in the art that the dependency shown herein is not restricted to UML. Any field of interest represented by diagrams where a dependency is created between objects and the objects are related by means of the dependency such as for example connectors, should fall within the scope of the invention.

The visual effects applied to the viewing area are not limited to highlighting of the connector 120a. Any number and combination of effects may be applied to any of the related elements. For example, the terminating and/or originating objects (120a, 120b) may be highlighted, the label of the connector 120b may be displayed, the label of the originating/terminating objects may be displayed, and the like. Upon completion of the cursor action, such as when the user releases the mouse button, the diagram is restored to its original view such as shown by one of FIGS. 2 and 3.

The cursor action may for example be clicking and holding the cursor on the connector, but is not limited in this manner. Any other types of mouse gestures such as mouse enter, etc., can also be used as a trigger for modifying the local view of the diagram.

In the above described manner, it is possible to intuitively display relevant objects of a large diagram without requiring a user to scroll around a window, zoom out, and/or resize a display window. This facilitates easier understanding and awareness of large diagrams. The above described display method is also advantageous in situations where labels are not associated with the objects or connectors.

Figure 5:
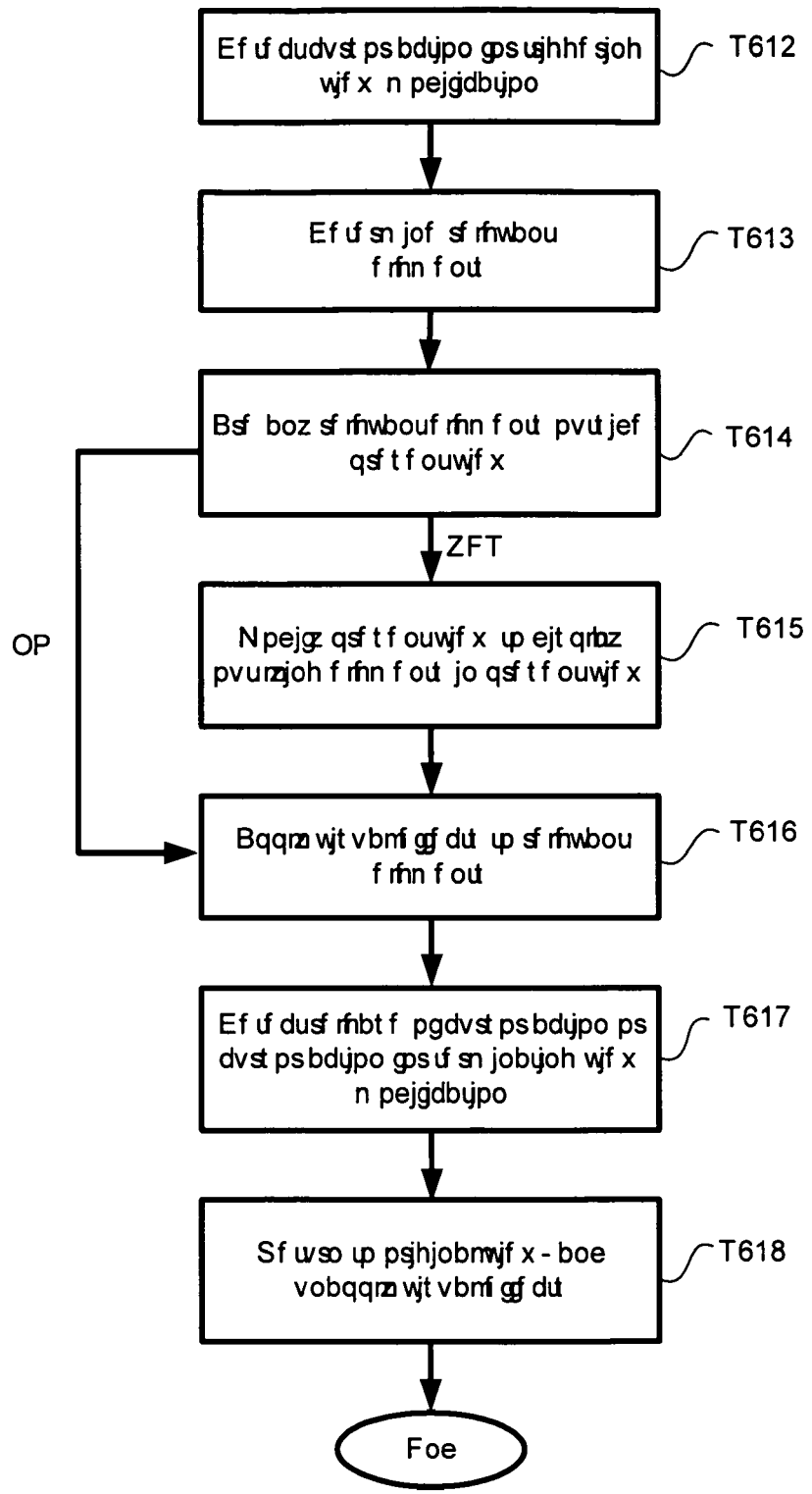
FIG. 5 is a flow chart of a view modification process.

FIG. 5 is a flow chart illustrating the steps of the above described method. The method begins at block S501 when a cursor action triggering the method is detected. At block S502, the relevant elements of the cursor action are determined. If the cursor action was performed on a connector, for example, the relevant elements would be the connector, the originating object, and the terminating object. On the other hand, if the cursor action was performed on an object, the relevant elements may be one or more of any connector terminating or originating to/from the object, the objects connected to the selected object, and/or any selection of connectors and objects related to the selected object according to a predefined selection or relationship function.

At block S503, it is determined if any of the relevant elements are outside of the current view. If none of the relevant elements are outside of the current view, the process skips to block S505. On the other hand, if one or more relevant elements are outside of the current view, the process proceeds to block S504 where the current view is modified such that all relevant elements are displayed in the current view. As described above, the current view may be modified in a number of ways which may be pre-set by a user.

At block S505, visual effects are applied to the relevant elements. As described above, the visual effects may be one or more of highlighting one or more of the relevant elements, or any other visual effect pre-set by the user.

The modified view of the diagram 100 is maintained until a cursor action indicating that the modified view should be concluded is detected (block S506). Upon detection of this cursor action, the displayed view is returned to the original view (the view being displayed before detection of the cursor action triggering the view modification), and all visual effects are unapplied.

Figure 6:
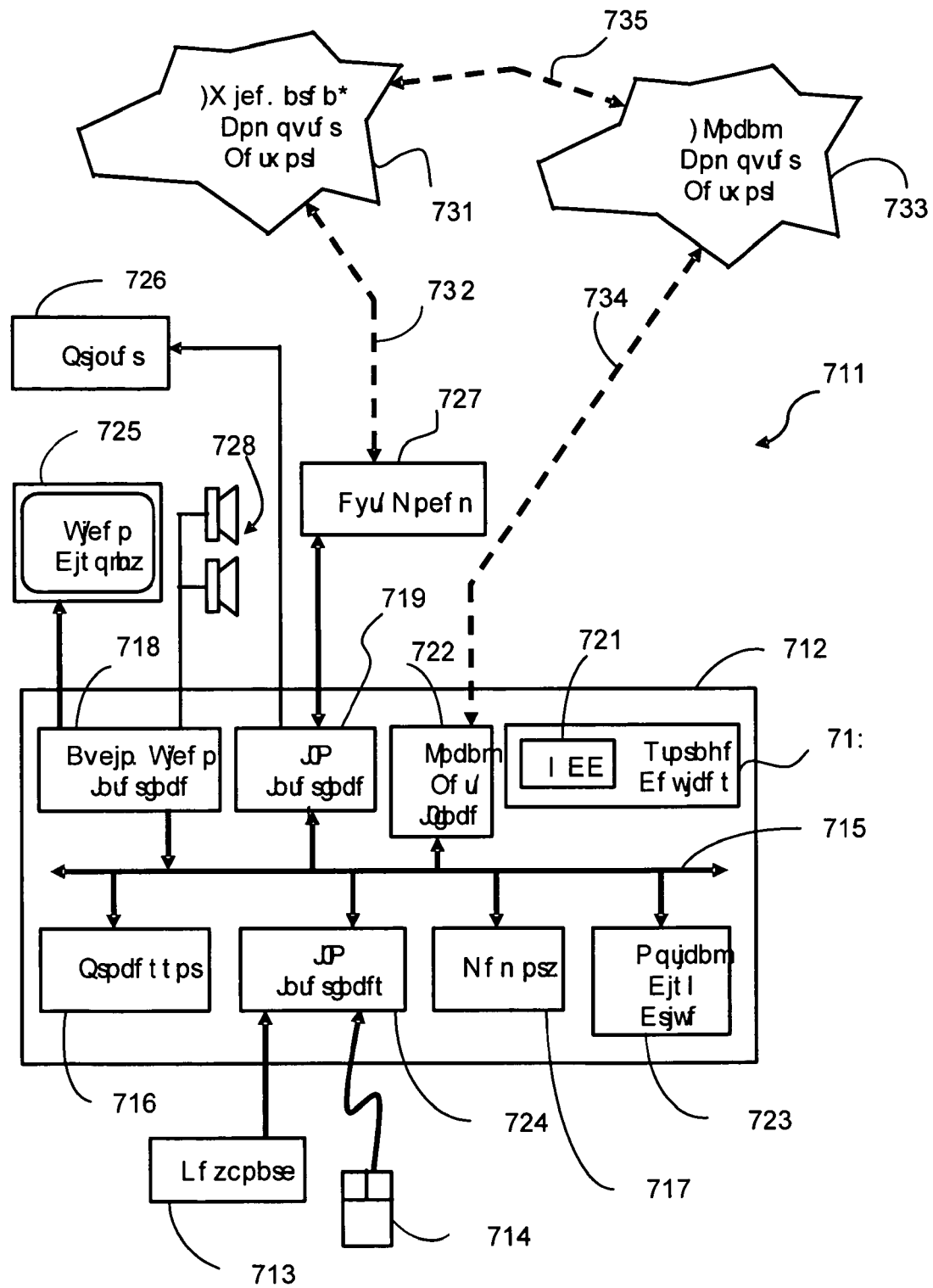
FIG. 6 illustrates a computer system on which a view modification process is embodied.

The above method of displaying a large diagram may be implemented using a computer system 600, such as that shown in FIG. 6 wherein the process of FIG. 5 may be implemented as software, such as one or more application programs executable by the computer system 600. In particular, the steps of the method of displaying the large diagram may be effected by instructions in the software that are carried out by the computer system 600. The instructions may be formed as one or more code modules, each for performing one or more particular tasks. The instructions, when executed by one or more appropriate components of the computer system 600, for example by one or more of a CPU, memory, and the like, represent a means for carrying out the tasks.

In one embodiment, the software may be stored in a computer readable medium, including the storage devices described below, for example. The software is loaded into the computer system 600 from the computer readable medium, and then executed by the computer system 600. A computer readable medium having such software or computer program recorded on it is a computer program product. The use of the computer program product in the computer system 600 preferably effects an advantageous apparatus for displaying large diagrams.

In another embodiment, the software may be provided to the computer system 600 as a data carrier signal. The data carrier signal may take the form of a wired and/or wireless signal operable, upon receipt by the computer system 600, to instruct the computer system 600 to effect the above display method. The data carrier signal may be embodied in one or more mediums, including computer readable storage mediums, air, vacuum, wires, and the like. The data carrier signal may be embodied in more than one medium during a lifetime of the data carrier signal.

Other ways of advantageously storing the software, providing, and executing on the computer system 600 are known in the art and being obvious to one skilled in the art, fall within the scope of the present invention.

As seen in FIG. 6, the computer system 600 is formed by a computer module 601, input devices such as a keyboard 602 and a mouse pointer device 603, and output devices including a printer 615, a display device 614 and loudspeakers 617. An external Modulator-Demodulator (Modem) transceiver device 616 may be used by the computer module 601 for communicating to and from a communications network 620 via a connection 621. The network 620 may be a wide-area network (WAN), such as the Internet or a private WAN. Where the connection 621 is a telephone line, the modem 616 may be a traditional "dial-up" modem. Alternatively, where the connection 621 is a high capacity (eg: cable) connection, the modem 616 may be a broadband modem. A wireless modem may also be used for wireless connection to the network 620.

The computer module 601 typically includes at least one processor unit 605, and a memory unit 606 for example formed from semiconductor random access memory (RAM) and read only memory (ROM). The module 601 also includes a number of input/output (I/O) interfaces including an audio-video interface 607 that couples to the video display 614 and loudspeakers 617, an I/O interface 613 for the keyboard 602 and mouse 603 and optionally a joystick (not illustrated), and an interface 608 for the external modem 616 and printer 615. In some implementations, the modem 616 may be incorporated within the computer module 601, for example within the interface 608. The computer module 601 also has a local network interface 611 which, via a connection 623, permits coupling of the computer system 600 to a local computer network 622, known as a Local Area Network (LAN). As also illustrated, the local network 622 may also couple to the wide-area network 620 via a connection 624, which would typically include a so-called "firewall" device or similar functionality. The interface 611 may be formed by an Ethernet™ circuit card, a wireless Bluetooth™ or an IEEE 802.11 wireless arrangement.

The interfaces 608 and 613 may afford both serial and parallel connectivity, the former typically being implemented according to the Universal Serial Bus (USB) standards and having corresponding USB connectors (not illustrated). Storage devices 609 are provided and typically include a hard disk drive (HDD) 610. Other devices such as a floppy disk drive and a magnetic tape drive (not illustrated) may also be used. An optical disk drive 612 is typically provided to act as a non-volatile source of data. Portable memory devices, such optical disks (eg: CD-ROM, DVD), USB-RAM, and floppy disks for example may then be used as appropriate sources of data to the system 600.

The components 605, to 613 of the computer module 601 typically communicate via an interconnected bus 604 and in a manner which results in a conventional mode of operation of the computer system 600 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on a storage device, for example the hard disk drive 610 and read and controlled in execution by the processor 605. Intermediate storage of such programs and any data fetched from the networks 620 and 622 may be accomplished using the semiconductor memory 606, possibly in concert with the hard disk drive 610. In some instances, the application programs may be supplied to the user encoded on one or more CD-ROM and read via the corresponding drive 612, or alternatively may be read by the user from the networks 620 or 622. Still further, the software can also be loaded into the computer system 600 from other computer readable media. Computer readable media refers to any storage medium that participates in providing instructions and/or data to the computer system 600 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 614. Through manipulation of the keyboard 602 and the mouse 603, a user of the computer system 600 and the application may manipulate the interface to provide controlling commands and/or input to the applications associated with the GUI(s).

The method of displaying large diagrams may alternatively be implemented in dedicated hardware such as one or more integrated circuits performing the functions or sub functions of one or more of the steps shown in FIG. 5. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiments being illustrative and not restrictive.

What is claimed is:

1. A method for displaying a relational diagram on a display, at least one view of the relational diagram being larger than an available viewing area provided by the display, the method comprising:
    detecting a predetermined action performed on a first element included in a first portion of a relational diagram displayed within a display area limit of a display screen; and,
    responsive to detecting the predetermined action performed on the first element:
        determining one or more relevant elements associated with the first element that is present in a second portion of the relational diagram in an area extending beyond the display area limit of the display screen so as to be unviewable in the display, and
        modifying the first portion of the relational diagram displayed within the display area limit of the display screen to include the one or more relevant elements dragging the one or more relevant elements from the second portion of the relational diagram displayed within the area extending beyond the display area limit of the display screen into the first portion of the relational diagram displayed within the display area limit of the display screen, wherein a location of any elements of the first portion of the relational diagram displayed within the display area limit of the display screen prior to the modification remains unchanged after the modification.

2. The method according to claim 1, wherein a relevant element from the one or more relevant elements that is dragged from the second portion of the relational diagram displayed within the area extending beyond the display area limit of the display screen into the first portion of the relational diagram displayed within the display area limit of the display screen is determined according to a priority of the one or more relevant elements and the first element.

3. The method according to claim 1, further comprising the step of applying visual effects to one or more of the first element and the one or more relevant elements.

4. A system for displaying a relational diagram on a display, whereon at least one view of the relational diagram is larger than an available viewing area provided by the display, the system comprising:
    a computer with memory and at least one processor and a display; and
    a display program comprising program instructions that execute in the memory of the computer in order to display a relational diagram on the display by:
        detecting a predetermined action performed on a first element included in a first portion of a relational diagram displayed within a display area limit of a display screen; and
    responsive to detecting the predetermined action performed on the first element:
        determining one or more relevant elements associated with the first element present in a second portion of the relational diagram in an area extending beyond the display area limit of the display screen so as to be unviewable in the display, and
        modifying the first portion of the relational diagram displayed within the display area limit of the display screen to include the one or more relevant elements from the second portion of the relational diagram displayed within the area extending beyond the display area limit of the display screen into the first portion of the relational diagram displayed within the display area limit of the display screen, wherein a location of any elements of the first portion of the relational diagram displayed within the display area limit of the display screen the modification remains unchanged after.

5. The system according to claim 4, wherein a relevant element from the one or more relevant elements that is dragged from the second portion of the relational diagram displayed within the area extending beyond the display area limit of the display screen into the first portion of the relational diagram displayed within the display area limit of the display screen is determined according to a priority of the one or more relevant elements and the first element.

6. The system according to claim 4, wherein the program instructions are further operable to apply visual effects to one or more of the first element and the one or more relevant elements.

7. A computer program product for displaying a relational diagram on a display, at least one view of the relational diagram being larger than an available viewing area provided by the display, the computer program product comprising a non-transitory computer readable storage medium having program instructions embodied therewith, the program instructions executable by a device to cause the device to perform a method comprising:
    detecting a predetermined action performed on a first element included in a first portion of a relational diagram displayed within a display area limit of a display screen; and,
    responsive to detecting the predetermined action performed on the first element:
        determining one or more relevant elements associated with the first element present in a second portion of the relational diagram in an area extending beyond the display area limit of the display screen so as to be unviewable in the display, and
        modifying the first portion of the relational diagram displayed within the display area limit of the display screen to include the one or more relevant elements from the second portion of the relational diagram displayed within the area extending beyond the display area limit of the display screen into the first portion of the relational diagram displayed within the display area limit of the display screen, wherein a location of any elements of the first portion of the relational diagram displayed within the display area limit of the display screen prior to the modification remains unchanged after the modification.

8. The computer program product according to claim 7, wherein a relevant element from the one or more relevant elements that is dragged from the second portion of the relational diagram displayed within the area extending beyond the display area limit of the display screen into the first portion of the relational diagram displayed within the display area limit of the display screen is determined according to a priority of the one or more relevant elements and the first element.

9. The computer program product according to claim 7, wherein the method further comprises the step of applying visual effects to one or more of the first element and the one or more relevant elements.

\* \* \* \* \*